United States Patent
Manico et al.

(10) Patent No.: US 7,042,486 B2
(45) Date of Patent: May 9, 2006

(54) IMAGE CAPTURE AND DISPLAY DEVICE

(75) Inventors: Joseph A. Manico, Rochester, NY (US); Wayne F. Niskala, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 214 days.

(21) Appl. No.: 10/264,058

(22) Filed: Oct. 3, 2002

(65) Prior Publication Data

US 2003/0030746 A1   Feb. 13, 2003

Related U.S. Application Data

(63) Continuation of application No. 09/452,091, filed on Nov. 30, 1999, now abandoned.

(51) Int. Cl.
   *H04N 7/18*   (2006.01)

(52) U.S. Cl. ............... 348/61; 348/14.14; 348/14.07; 348/14.11; 348/14.03; 348/207; 349/86; 349/7; 349/10; 349/16

(58) Field of Classification Search .............. 348/61, 348/14.01, 42, 14.03, 14.07, 14.11, 14.14, 348/207; 349/86, 5, 16, 7, 10
See application file for complete search history.

(56) References Cited

U.S. PATENT DOCUMENTS

| | | | |
|---|---|---|---|
| 4,435,047 A | 3/1984 | Fergason | |
| 4,864,410 A | 9/1989 | Andrews et al. | |
| 5,027,219 A | 6/1991 | Stuttler et al. | |
| 5,036,251 A * | 7/1991 | Lee | 348/180 |
| 5,430,474 A * | 7/1995 | Hines | 348/42 |
| 5,463,482 A * | 10/1995 | Jones | 349/86 |
| 5,686,979 A * | 11/1997 | Weber et al. | 349/96 |
| 5,801,758 A * | 9/1998 | Heirich | 348/14.16 |
| 5,986,810 A | 11/1999 | Webb | |

* cited by examiner

*Primary Examiner*—Shawn S. An
(74) *Attorney, Agent, or Firm*—Frank Pincelli

(57) ABSTRACT

An image capture and display device includes an electronic motion image camera for capturing the image of a subject located in front of the image display device and a digital projector for projecting the captured image. An optical element provides a common optical axis electronic camera and the digital electronic camera, and a light valve projection screen electronically switchable between a transparent state and a frosted state, is located with respect to the common optical axis for allowing the electronic camera to capture the image of the subject through the projection screen when in the transparent state and for displaying the captured image on the projection screen when in the frosted state. A controller connected to the electronic camera, the digital projector, and the light valve projection screen alternately places the projection screen in the transparent state and causes the electronic camera to capture an image, and places the projection screen in the frosted state and causes the digital projector to display the captured image on the projection screen.

7 Claims, 2 Drawing Sheets

IMAGE CAPTURE AND DISPLAY DEVICE

CROSS REFERENCE TO RELATED APPLICATIONS

This is a continuation of application Ser. No. 09/452,091 filed Nov. 30, 1999 now abandoned entitled Image Capture and Display Device.

FIELD OF THE INVENTION

The present invention relates to an electronic image capture and display device that has a mirror-like function, and in particular an image capture and display device of the type employing an electronic camera to capture an image of a subject and an electronic image display device to display the captured image.

BACKGROUND OF THE INVENTION

U.S. Pat. No. 4,864,410, issued Sep. 5, 1989 to Andrews et al., illustrates a technique using a beam splitter, electronic camera, and a video display (CRT) to simultaneously capture and view a subject on the same optical axis similar to the function of a conventional optical mirror. The images captured by the camera can be processed prior to display to provide special effects such as the distortions employed in a fun-house mirror. The problem with this technique is that the displayed image appears to be located at a distance behind the beam splitter, compromising the "mirror-like" function of the unit. In addition, the video display device must be masked off or it may be viewable by the user also detracting from the "mirror experience". It is well known and desirable to use a touch screen as a means for providing an interface between a user and a display device such as a CRT, however with the arrangement described by Andrews et al., the interface with a touch screen located between the user and the beam splitter does not provide a satisfactory feel, since when the subject places her finger on the touch screen, the image of the subject's finger does not appear to be located at the screen, rather it appears to be displayed to the rear of the screen.

Using a conventional rear projection screen and a digital projector would provide a display image that would appear in a viewing plane like a conventional mirror, and would function in a satisfactory manner with a touch screen interface, but a conventional rear projection screen would prevent the camera from "seeing" the subject, unless a hole was provided in the center of the screen. This is not a very satisfactory solution.

U.S. Pat. No. 5,801,758 issued Sep. 1, 1998 to Heirich discloses a system for image capture and display. The system includes an image capture apparatus, an image projection apparatus, and an optical switching device that switches an optical path between the image capture and the image projection apparatus. A highly transparent surface, such as a sheet of clear glass is used as a display screen through which the image capture apparatus can view a user, and onto which an the image of the user is projected. The problem with this arrangement is that the highly transparent surface allows the user to directly view the projection lens of the image projection apparatus. Any image formed on the highly transparent surface is overwhelmed by the bright appearance of the projection lens.

There is a need therefore for an improved image capture and display device with mirror-like function that avoids these shortcomings.

SUMMARY OF THE INVENTION

The above mentioned problems are solved according to the present invention by providing an image capture and display device that includes an electronic motion image camera for capturing the image of a subject located in front of the image display device and a digital projector for projecting the captured image. An optical element provides a common optical axis electronic camera and the digital electronic camera, and a light valve projection screen electronically switchable between a transparent state and a frosted state, is located with respect to the common optical axis for allowing the electronic camera to capture the image of the subject through the projection screen when in the transparent state and for displaying the captured image on the projection screen when in the frosted state. A controller connected to the electronic camera, the digital projector, and the light valve projection screen, alternately places the projection screen in the transparent state and causes the electronic camera to capture an image, and places the projection screen in the frosted state and causes the digital projector to display the captured image on the projection screen.

The present invention has the advantage that a more realistic mirror-like viewing situation is provided. An additional advantage is that a touch sensitive operator interface may be employed at the projection screen and it will appear to operate in the conventional manner, i.e. the image of the user's finger will meet the real finger at the surface of the screen.

DETAILED DESCRIPTION OF THE INVENTION

Figure 1:
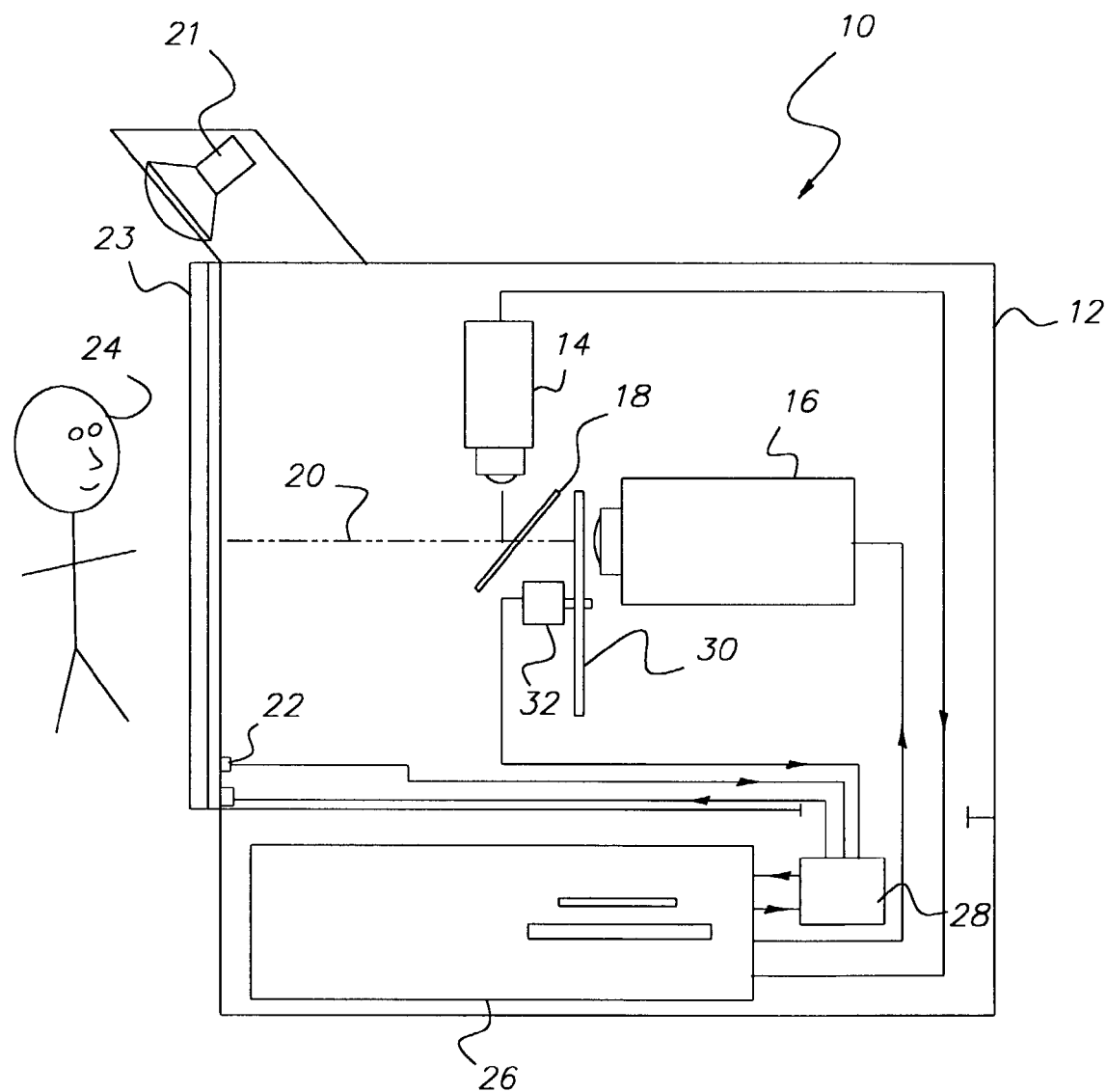
FIG. 1 is a schematic diagram of an image capture and display device according to the present invention.

Referring to FIG. 1, the image capture and display device, generally designated 10, according to the present invention is housed for example in a cabinet 12. It will be understood that the capture and display device may be a component of a larger device such as a photobooth (not shown). An electronic motion image camera 14 such as a KODAK DIGITAL SCIENCE DVC323 Digital Video Camera available from the Eastman Kodak Company, Rochester, N.Y., and a digital image projector 16 such as a KODAK DP800 Digital Projector (Kodak catalog number 884 7477) available from the Eastman Kodak Company, Rochester, N.Y., are located in the cabinet 12 with respect to an optical element such as a partially silvered mirror 18 in a known manner such that they share a common optical axis 20. A light 21 may be provided to illuminate a subject 24.

A front opening of the cabinet 12 contains a light valve projection screen 22 that is electronically switchable between a transparent state and a frosted state, and optionally a touch screen 23. The touch screen 23 can be of the type having an array of infrared transmitters and detectors arranged around the periphery of the projection screen 22, or a transparent pressure sensitive panel disposed over the projection screen 22. The light valve projection screen 22 is located with respect to common optical axis 20, for allowing the electronic camera 14 to capture the image of a subject 24 through the projection screen when in the transparent state and for displaying the captured image by the digital image projector 16 when in the frosted state.

The light valve projection screen 22 may comprise for example a liquid crystal film that changes state when an electrical current is applied. In the "power off" state, the material is "frosted" and suitable for rear projection. In the "power on" state, the material is clear and suitable for the camera to "see" through. The interior and contents of the cabinet 12 is unlighted and painted a matte black so that when the projection screen 22 is in the "power on" state, a subject 24 does not see the interior of the cabinet.

Figure 2:
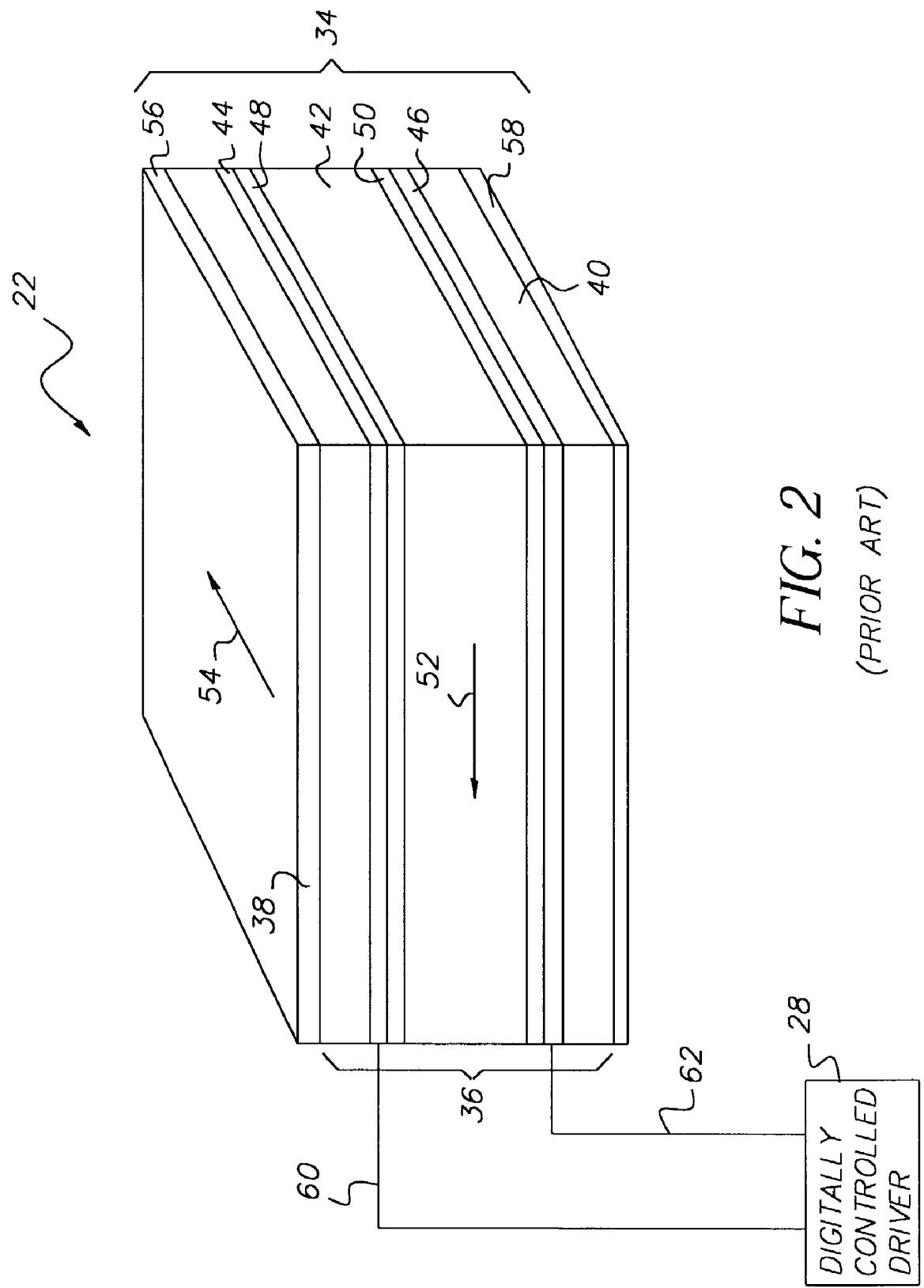
FIG. 2 is a diagram of a prior art switchable optical panel used as a light valve projection screen in the present invention.

A liquid crystal film suitable for practicing the present invention is available from the 3M Corporation under the name of 3M Privacy Film®. One way of constructing such a film is taught in U.S. Pat. No. 4,435,047 issued Mar. 6, 1984 to Fergason. The operation of the privacy film as a light valve projection screen will be described with reference to FIG. 2. In FIG. 2, light valve projection screen 22 includes a switchable optical panel 34, in which the optically active layer comprises a liquid crystal device 36. Liquid crystal device 36 comprises a pair of transparent planar substrates 38 and 40 in parallel register, overlying and spaced apart from one another. The periphery of the substrates are joined and sealed with an adhesive sealant (not shown) to define an enclosed cavity. The cavity is filled with liquid crystal material 42. A conductive material is provided on the inner surface of the substrates to allow voltage to be applied across the liquid crystal material. The conductive material may be in the form of continuous transparent conductive layers 44 and 46. Alignment layers 48 and 50 disposed on the inner surfaces of the transparent conductive layers cause a desired orientation of the liquid crystal material 42 at its interface with each substrate. Arrows 52 and 54 show how the molecules of the liquid crystal material are aligned in approximately a 90 degree twist by the alignment layers 48 and 50 in the absence of an electrical field. The liquid crystal device is preferably a twisted nematic (TN) liquid crystal device having an angle of rotation of between 0 deg and 90 deg, more preferably between 80 deg and 90 deg. Finally, polarizers 56 and 58 are disposed on the outer surfaces of substrates 38 and 40 respectively, and serve to separate randomly polarized light into is plane-polarized components. Screen 22 is connected to driver 28 (see FIG. 1) via electrical leads 60 and 62.

Returning to FIG. 1, control of the image capture and display device, and digital image processing is provided by a computer 26, such as a standard microprocessor or personal computer, to which the output of the motion image camera 14 and the input to the digital projector 16 are connected. The computer 26 functions as both a controller and an image processing computer. It will be understood that a separate controller and digital image processing electronics can be provided. A digitally controlled driver 28 is provided for driving the light valve projection screen 22 to switch it back and forth between its transparent and frosted states.

In operation, the controller 26 first switches the light valve projection screen 22 to its transparent state by signaling driver 28 to energize the screen, then captures an image from camera 14, switches the light valve projection screen 22 to its frosted state, again via a signal to driver 28 to turn off the screen, making it frosted, and then projects the previously captured image onto the light valve screen 22 using the digital image projector 16. This cycle is then repeated 15 to 30 complete cycles per second to provide the appearance of a smooth and "flicker free" display. The captured images may be processed by the computer 26 prior to display using known image processing techniques. For example, the images may be geometrically distorted as in a fun house mirror. Alternatively, background scenes may be added using known blue screen techniques, colors may be modified or pre-stored image elements, such as mustaches, hats, glasses etc. may be digitally added. Also articles of clothing may be added to the image of the subject, for example to show how the subject would appear in the article of clothing.

In the simplest case, with interleaved video (NTSC or PAL for instance), the switching back and forth between view and display is performed on alternating fields of video, i.e., the even fields are employed for viewing and the odd fields for displaying the processed image. Furthermore, the processed image does not need to immediately follow the capture, but may be delayed by several frames to allow time for the digital processing to be preformed. A mechanical shutter 30, comprising, for example, a disc having an aperture therein, driven by a motor 32 may be provided between the digital image projector 16 and half silvered mirror 18 to improve the contrast of the device, particularly if the digital projector 16 does not include an internal shutter.

The invention has been described in detail with particular reference to certain preferred embodiments thereof, but it will be understood that variations and modifications can be effected within the spirit and scope of the invention.

PARTS LIST 10 image capture and display device
12 cabinet
14 electronic motion image camera
16 digital image projector
18 partially silvered mirror
20 common optical axis
21 light
22 light valve projection screen
23 touch screen
24 subject
26 computer
28 digitally controlled driver
30 mechanical shutter
32 motor
34 optical panel
36 liquid crystal device
38 transparent substrate
40 transparent substrate
42 liquid crystal material
44 transparent conductive layer
46 transparent conductive layer
48 alignment layer
50 alignment layer
52 alignment arrow
54 alignment arrow
56 polarizer
58 polarizer
60 electrical lead
62 electrical lead

What is claimed is:

1. An image capture and display device, comprising:
    a) an electronic motion image camera for capturing the image of a subject located in front of the image capture and display device;
    b) a digital projector for projecting the captured image;
    c) an optical element located with respect to the electronic camera and the digital projector to provide a common optical axis therefor;

d) a light valve projection screen electronically switchable between a transparent state and a frosted state, located with respect to common optical axis, for allowing the electronic camera to capture the image of the subject through the projection screen when in the transparent state and for displaying the captured image on the projection screen when in the frosted state; and e) a controller connected to the electronic camera, the digital projector, and the light valve projection screen for alternately placing the projection screen in the transparent state and causing the electronic camera to capture an image, and placing the projection screen in the frosted state and causing the digital projector to display the captured image on the projection screen.

2. The image capture and display device claimed in claim 1, further comprising a touch screen coextensive with the light valve projection screen.

3. The image capture and display device claimed in claim 1, wherein the optical element is a partially-silvered mirror.

4. The image capture and display device claimed in claim 1, further comprising a mechanical shutter located between the digital projector and the optical element for blocking the output of the projector when the projection screen is in a transparent state.

5. The image capture and display device claimed in claim 1, further comprising image processing electronics for modifying the captured image prior to display.

6. The image capture and display device claimed in claim 5, wherein the modification is a geometrical image distortion.

7. The image capture and display device claimed in claim 5 wherein the modification is an addition of a element to the image.

* * * * *